J. G. MOXEY.
Hulling Wheat.
No. 82,238.
Patented Sept 15, 1868.
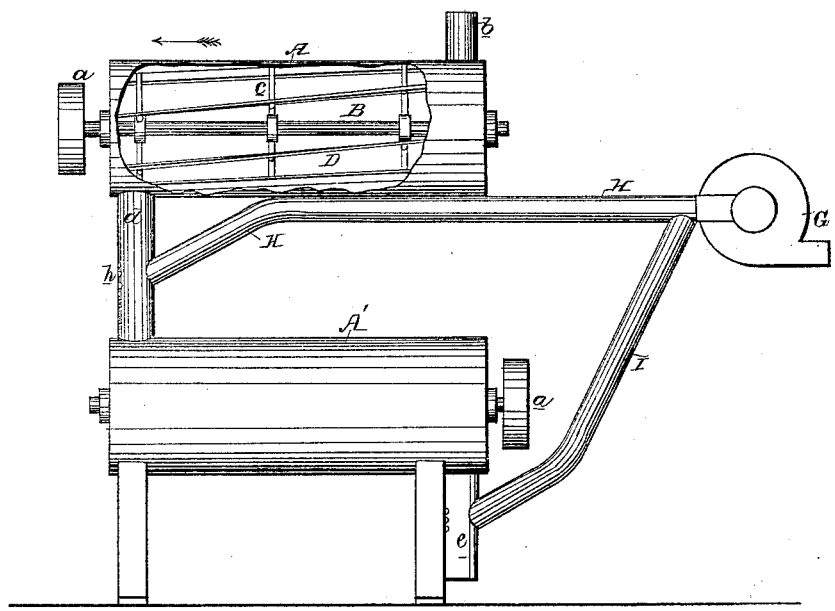

United States Patent Office.

JOHN G. MOXEY, OF PHILADELPHIA, PENNSYLVANIA, ASSIGNOR TO HIMSELF, HENRY C. CAREY, AND ABRAHAM HART, OF THE SAME PLACE.

*Letters Patent No. 82,238, dated September 15, 1868.*

IMPROVED PROCESS OF DEBRANNING WHEAT.

*The Schedule referred to in these Letters Patent and making part of the same.*

TO ALL WHOM IT MAY CONCERN:

Be it known that I, JOHN G. MOXEY, of Philadelphia, Pennsylvania, have invented an Improvement in Unbranning Wheat; and I do hereby declare the following to be a full, clear, and exact description of the same, reference being had to the accompanying drawing, and to the letters of reference marked thereon.

My invention relates to an improvement in the process of unbranning wheat, described in the patent granted to Samuel Bentz, on the eleventh day of February, 1862; and my improvement consists in subjecting grain, while in a dry state, to the action of blades, which pass through the mass of grain, as fully described hereafter, and thus remove the bran.

In order to enable others skilled in the art to practise my invention, I will now proceed to describe the manner of carrying it into effect.

Before I proceed to describe my invention, it will be well to refer to the aforesaid patent of Samuel Bentz, in which he declares that the unbranning process can be best accomplished when the wheat is in a moist state; the claim for this part of his invention being for "the employment of an unbranner, for removing the husk or bran from edible grain in a moist state, consisting of a horizontal cylinder with inclined revolving wings, constructed substantially as and for the purpose set forth."

In endeavoring to carry the invention of the said Bentz into practice, I discovered that the unbranning of the wheat could be best accomplished while it was dry, and not in the moist state supposed to be essential by the said Bentz, as, when treated in a wet state, particles of dust adhere to the grain, and, when ground with it, discolor the flour.

After the grain has been moistened, also, it is extremely difficult to dry. Flour made from the same will not bolt freely, and is apt to become sour, if kept for any considerable length of time.

The figure in the accompanying drawing represents an unbranning-apparatus, similar to that described in the said patent, with this exception, that no appliances for moistening the grain are used in connection with it.

A and A' are two hollow cylinders, arranged horizontally, one above the other, each cylinder having a central shaft, B, which turns in the ends of the cylinder, and to which are secured a series of arms, C, carrying inclined vanes or blades D, each shaft being furnished with a pulley, $a$, adapted to the reception of a driving-belt, which should cause the shaft to revolve at the rate of about four hundred revolutions per minute.

The grain, having been previously screened, is admitted to the interior of the highest cylinder, at or near one end of the same, through the pipe $b$; and at once assumes the position of a layer all around the interior of the cylinder, owing to the rapidly-revolving blades, which also cause a proper amount of compression and attrition of the grains upon each other, and against the interior of the cylinder and sides of the blades, by which the husk is loosened without injuring the kernels. At the same time, the mass of grain is moved, in the direction of the arrow, to the end of the cylinder opposite to that where it entered in the first instance, owing to the inclination of the blades; the grain finally passing through the pipe or spout $d$ to the lower cylindrical casing A', which is constructed precisely like the first, and in which the grain is acted upon, in the manner above described, until it escapes through the spout $e$.

In any suitable position, adjacent to the above-described apparatus, is secured an exhaust-fan, G, with the central opening of which communicate the two pipes, H and I, the former communicating with the spout $d$, and the latter with the spout I, precisely as described in the aforesaid patent of Samuel Bentz, and as illustrated in the drawing.

In the spout $d$, opposite the point of its communication with the pipe H, are openings $h$, which may be covered with wire gauze, and in the spout $e$, opposite the point where the pipe I communicates with it, are similar openings, and through these openings currents of air must pass, owing to the action of the fan, and carry with them the husks and light foreign matter, without interfering with the passage of the unbranned kernels through the spouts to their proper destination.

By subjecting the grain while dry to the action of revolving blades in a cylinder, the bran is most effectually removed, and, after being ground, the flour will bolt freely, while the dust may be entirely removed from the grain before grinding, and the quality of the flour is consequently not impaired.

The advantages resulting from unbranning the grain by the dry process are principally experienced when the grain is being treated for the purpose of separating the bran and the inner core or heart from the intermediate case or skin, from which an article of food, (termed cerealena,) especially appropriate for children and invalids, is obtained, as is fully described in the Letters Patent granted to J. E. Brown, on the fourteenth day of June, A. D. 1864.

I have found, by repeated experiments, that, when the grain is treated by the dry process, the amount of cerealena obtained is one-half greater than can be separated from the same material when the wet process is employed.

It should be understood that, although I have illustrated and described two cylinders, A and A′, with their appliances, as preferable for a thorough accomplishment of the desired object, one cylinder only can be used.

In the aforesaid patent of Samuel Bentz, the inventor refers to the interior of the cylinders as being fluted. I have found, by practical tests, that the flutings are unnecessary, and that the interior of the cylinders may be perfectly smooth.

I am aware that grain has heretofore been subjected to the action of revolving blades in a hollow cylinder, for the purpose of removing smut from the same, the grain being treated in particles, and not in a mass, and the action never being of such a character as to cause the removal of the bran.

Without claiming as new the apparatus described,

I claim as my invention, and desire to secure by Letters Patent—

As an improvement on the process described in the aforesaid patent of Samuel Bentz, the within-described improved process of debranning wheat, that is to say, subjecting the grain, without the use of steam, and while in a dry state, to the action of the blades, in the manner described.

In testimony whereof, I have signed my name to this specification in the presence of two subscribing witnesses.

J. G. MOXEY.

Witnesses:
   HENRY HOWSON,
   JOHN WHITE.